July 18, 1939.  T. ANDERSON  2,166,699
BRAKE TESTING APPARATUS
Filed Dec. 14, 1936
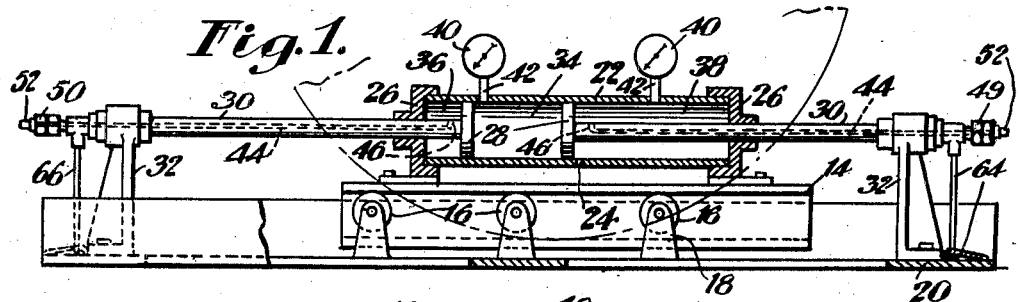
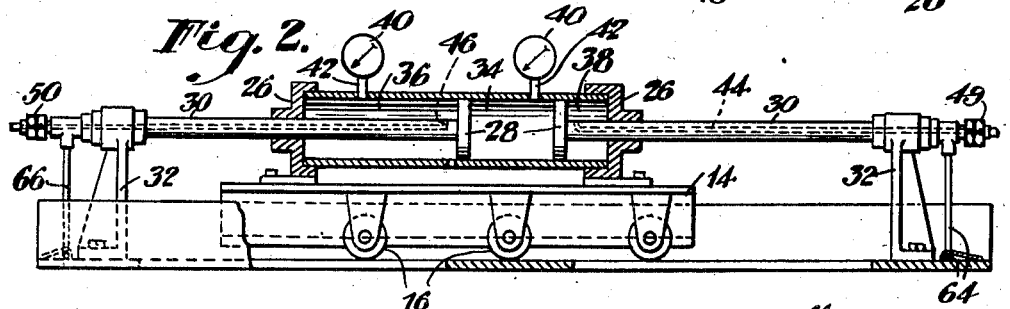
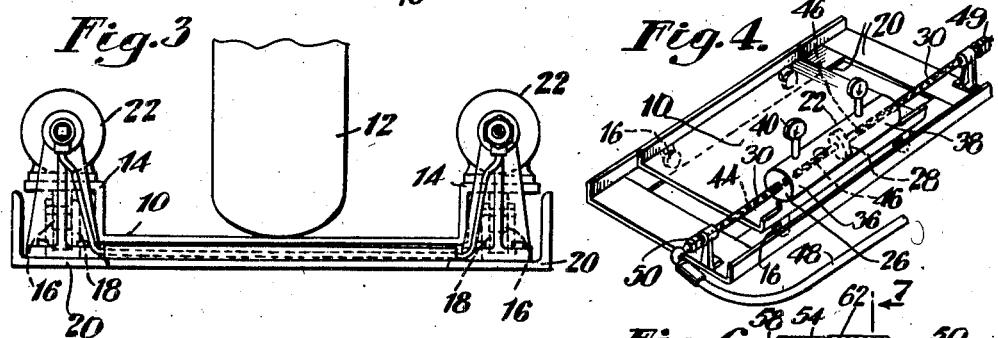
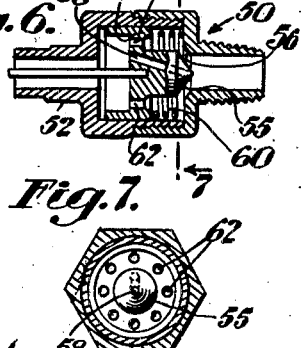
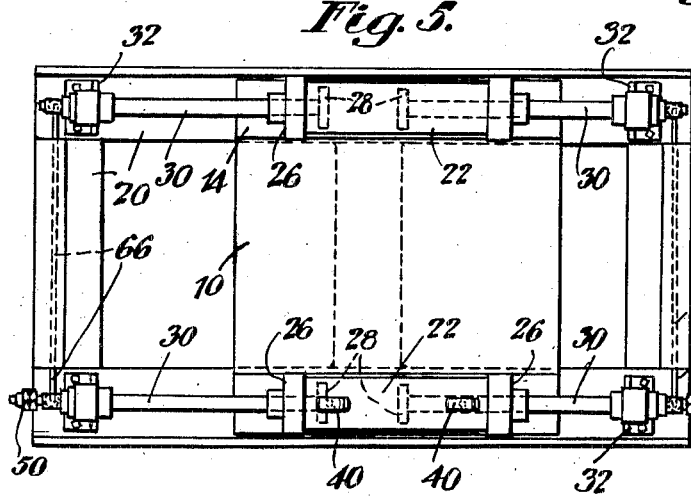
INVENTOR
THOMAS ANDERSON
BY
ATTORNEY Patented July 18, 1939

2,166,699

UNITED STATES PATENT OFFICE 2,166,699

BRAKE TESTING APPARATUS

Thomas Anderson, Elizabeth, N. J., assignor to Power Patents Company, Hillside, N. J., a corporation of Maine Application December 14, 1936, Serial No. 115,649

10 Claims. (Cl. 265—47)

This invention relates to apparatus for testing vehicle brakes, and more particularly relates to improved brake testing apparatus of the general type in which the brakes of a vehicle wheel are tested by mounting the wheel on a movable platform which it frictionally engages, and measuring the resistance offered by the brakes when set, to movement of the wheel and platform.

Objects of the present invention are to provide vehicle brake testing apparatus: of simple design and low cost; capable of giving accurate and dependable readings; of light weight and easily portable construction; capable of easy manipulation by a single operator having the duty of simultaneously making adjustments of the brakes; having its movable platform elevated not more than one or two inches from the ground or floor so that the vehicle operator can easily place the wheel of the vehicle under examination in correct engagement position on the platform.

There are brake testing units now available embodying a movable platform for engaging the wheel of a vehicle, and mechanism for actuating the platform including either cranks which the operator must manipulate, or expensive and especially constructed high pressure leakage tight oil or other pressure fluid actuated plungers connected to move the platform and wheel in one direction.

A special feature of the present invention resides in an improved form of platform actuating mechanism adapted for reciprocating the platform in both a forward and reverse direction, and which requires a minimum manipulation by the operator since it makes use of normally available high pressure air applied to move the platform through means which are both simple and inexpensive in design.

With the foregoing and other objects and features in view the invention consists in the improved vehicle brake testing apparatus which is hereinafter described and more particularly defined by the accompanying claims.

In the following description reference will be made to the attached drawing, in which:

Fig. 1 is a view in side elevation, with parts in longitudinal section, showing a preferred design of the brake testing apparatus;

Fig. 2 is another view in side elevation, with parts in longitudinal section, illustrating the movable cylinder and platform, with modified form of platform mounting, in different position than shown in Fig. 1;

Fig. 3 is an end elevation of the brake tester, showing a tired automobile wheel mounted on the movable platform in frictional engagement therewith;

Fig. 4 is a perspective view of a modified arrangement of actuating elements for the movable platform of the brake tester;

Fig. 5 is a plan view of the brake tester of Fig. 1, with the movable elements approximately in the same position as illustrated in Fig. 1;

Fig. 6 is a view in longitudinal section of a preferred design of two-way valve which forms one of the elements of the platform actuating mechanism; and Fig. 7 is a transverse sectional view of the actuating valve taken on the plane 7—7 of Fig. 6.

The brake testing apparatus of the present invention resembles prior art brake testing apparatus in employing a movably mounted platform 10, the top surface of which supports and frictionally engages a wheel 12 of a vehicle, the brakes of which are under examination. The apparatus differs from prior art brake testing units in that the upper wheel supporting surface of the platform 10 is only elevated an inch or two above the normal ground or floor level on which the apparatus rests, so that it is very easy for an operator to drive a vehicle to a position in which a wheel 12 rests on and engages the top of the platform. The platform 10 may be provided with a pair of elevated lateral shoulders or side rails 14 (Figs. 1 and 3) which are movably supported on rollers 16 carried by bearing pedestals 18 attached to a stationary frame 20. The base of frame 20 is preferably rectangular and flat and adapted for resting on a level surface such as the ground or a driveway or garage floor. The pedestals 18 and the rollers 16 which they support are of sufficient height to hold the elevated side rails 14 of platform 10 above the ground level a sufficient distance to provide a small clearance between the bottom of the platform and the cross braces of the frame 20. The assembly of elements just described for affording relatively movable connections between the frame 20 and the platform 10 can be modified by attaching rollers to the elevated side rails of platform 10 in position to engage supporting rails on the frame (see Fig. 2). The rollers may even be eliminated by substituting other low frictional slidable connections between the movable platform 10 and stationary frame 20.

The preferred mechanism for actuating the platform 10 on its movable mounting against the resistance of the brakes of the vehicle wheel 12 includes a pair of cylinders 22 each mounted on and attached to one of the side rails 14 of the platform 10 for movement therewith. Each cylinder 22 has an apertured pressure relief port 24 in a side wall midway between the end walls 26, communicably connecting the interior of the cylinder with atmosphere. Likewise there is mounted in each of the cylinders 22 shown in Figs. 1, 3 and 5, intermediate end walls 26, a pair of pistons 28 forming piston means which are held in stationary uniformly spaced parallel relation transversely within the cylinders by means of horizontal stationary tubes 30 forming stationary support means, which are in turn supported by posts 32 (resembling bearing block supports) attached to frame 20. The peripheries of the pistons 28 form a fairly tight pressure sealing fit with the inner walls of the cylinder 22, and each pair of pistons partitions the interior of cylinder 22 into three chambers of which chamber 34 is a constant volume chamber lying between the two pistons 28, and chambers 36 and 38 are variable volume chambers lying between the pistons 28 and the adjacent end walls 26 of the cylinder 22. A pair of gauges 40 are provided for each cylinder 22, with conduits 42 communicably connecting the gauges respectively with the interior of the cylinder 22 at points approximately midway between the end walls 26 and the apertured relief passage 24. Each cylinder 22 with its centrally apertured ends 26 is slidably journaled on the coaxial pistons 28 and piston supporting tubes 30.

In the modified design shown in Fig. 4 only one piston 28 is mounted in a cylinder 22 on a stationary supporting rod 30 forming stationary supporting means extending lengthwise through the cylinder and which is longitudinally bored at each side of the piston for introduction of air to, and removal of air from, the variable volume chambers 36, 38 lying between the piston and the end walls 26 of the cylinder.

The platform 10 is mounted for reciprocation in either direction on its supporting rollers 16 in order that the brakes of the vehicle wheel 12 may be checked when the wheel is rotating either forwardly or backwardly. For ease of manipulation by an operator having the duty of adjusting the brakes of the vehicle under test, the apparatus is designed for actuation by fluid under pressure, and more specifically by compressed air such as is normally available at any automobile service station or garage. When air is admitted to one of the variable volume chambers 36, 38, under a pressure sufficient to move the cylinder and platform 10 in one direction, the resulting pressure which tends to build up in the other chamber 38, 36 is relieved, and thereby offers no back pressure, retarding the movement of the platform. For convenience the preferred design of brake tester employs the tubes 30 for holding the pistons 28 in fixed space relation within the cylinders 22, and also employs longitudinal bores 44 within the tubes 30, and apertures 46 at the piston ends of the tubes immediately behind the pistons 28, for communicably connecting the bores with the chambers 36 and 38. One of the chambers 36 or 38 may be connected through the bore of the corresponding tube 30 to a pipe or hose 48 leading from a source of air under high pressure, while the other chamber is simultaneously connected to atmosphere through the bore of the other tube.

The length of travel of the cylinder and platform from a position such as shown in Fig. 1 to the position shown in Fig. 2 is automatically limited by the relief port 24 which is brought into communication with chamber 36 to relieve the pressure therein whenever the mid-point of the cylinder passes the periphery of the piston 28 which forms one partition wall of chamber 36.

A pair of identical two-way flow valves 49, 50 are mounted respectively on the post supported ends of the tubes 30 which are axially aligned with and support pistons in one of the cylinders 22. The valves 49, 50 are connected to the ends of the tubes 30 so that the pressure supply sides of the valves extend beyond the ends of the tubes in position for fitting the air supply hose 48 over a sleeve 52. When air under pressure is supplied to the pressure side of valve 50 (Fig. 1), a plunger 54 (Fig. 6) carrying a plug valve 55 is forced by the air pressure against its seat 56, and air under pressure passes through the plug 55 into the bore 44 within the tube 30 through a single small orifice 58 in the plug. As the air under pressure enters the corresponding chamber 36 in cylinder 22, pressure is rapidly built up therein to a point where the cylinder and platform 10 start to move toward the position illustrated in Fig. 2 against the resistance of the brake on wheel 12. This action tends to compress the air in the other variable volume chamber 38, but no substantial back pressure is actually built up in chamber 38 by reason of the fact that air is released through the other valve 49, the plunger 54 therein being normally held away from its seat 56 by a coil spring 60, thereby permitting air to exhaust through a plurality of apertures 62 in the plunger as well as through orifice 58 in the plug 55 at a rate which is at least as great as the rate of introduction of air under pressure into the opposite chamber 36 through the single orifice 58 in the valve 50.

It will be understood that platform 10 can be reciprocated either forwardly or backwardly by application of air under pressure to one or the other of the chambers 36 or 38 in a single cylinder 22 (Fig. 4). However, to eliminate torsional strain on the plate 10 and on its supporting mounting, the preferred design of the present apparatus contemplates the use of two cylinders 22, each mounted on opposite lateral shoulders 14 of the plate 10, and each equipped with variable volume chambers 36, 38 at each end communicating with centrally bored air supply tubes 30. In order that the cylinders 22 may co-operate in effecting movement of the platform 10, the parallel tubes 30 at adjacent ends of each of the cylinders 22 have their bores communicably connected by a tube 64, and the corresponding tubes on the opposite ends of each of the cylinders 22 are communicably connected by a corresponding tube 66, so that whenever high pressure air is introduced to the chamber 36 at the end of one cylinder 22, part of the air is also conducted by the connecting tube 66, into the corresponding variable volume chamber 36 in the other cylinder. When the cylinders start to move to reduce the volumes of chambers 38, air is released from the chambers 38 in both cylinders through the corresponding bored tubes 30 and connecting tube 64 and through the valve 49 at the end of one of the tubes 30, communicating with one chamber 38.

Since air is usually available in quantities at high pressure (say 100 lbs. per square inch) for operating the brake testing apparatus of the present invention, it is not necessary that the cylinder 22-piston 28 combination of the present invention be expensively designed and perfectly leak-proof. All that it is necessary is that the leakage from the chambers 36 or 38 shall be at a lower rate than that at which air under pressure is supplied to the same chambers.

The operation of the brake testing apparatus is very simple. The entire apparatus on its supporting frame 20 can be shifted around by a single operator to any desired location, and the operator of a vehicle can readily drive one wheel of the vehicle onto the platform 10, where the weight of the vehicle holds the wheel 12 in frictional engagement with the top of the platform. The platform 10 is preferably brought to one end of its travel (Figs. 1 and 3) before a test is started, and the brakes are set on the wheel 12. Air under pressure is admitted to one of the variable volume chambers 36 in a direction tending to move the cylinder and platform 10 toward its opposite end of travel (Fig. 2). As the air pressure builds up in the chamber 36 to which air is introduced, it finally exceeds the pressure required to move the cylinder under the resistance offered by the brakes on the wheel 12 under test. As previously indicated, each of the cylinders 22 is rigidly attached to the platform 10, so that the cylinder cannot move until the pressure within the chamber 36, to which air is supplied, exceeds the resistance offered by the vehicle brakes, and this resistance of course varies with the braking power. The pressure registered by the gauge 40 which communicably connects with the pressure chamber measures the braking resistance, and thus indicates the relative strength of the braking mechanism of the wheel under test. A corresponding test of the brake with the wheel rotating in the opposite running direction can be made by simply shifting the connection of the air supply pipe 48 to the other valve 49, and applying air pressure to move the platform 10 in the opposite direction.

The invention having been thus described, what is claimed as new is:

1. In vehicle brake testing apparatus including a platform movably mounted for reciprocation while supportedly engaging a wheel controlled by the brake under test, the combination of a portable supporting frame for the platform and a relatively movable mounting between the frame and platform, and mechanism for reciprocating the platform including a fluid pressure cylinder having side and end walls attached to said platform for movement therewith, a piston means mounted in stationary transverse relation within said cylinder as a partition forming with the walls thereof two variable volume chambers, a pair of gauges each communicably connected with one of said chambers for measuring pressures developed therein, and stationary supporting means connected to the piston means and comprising combination pressure fluid supply and relief conduits including valves communicably connected respectively with each chamber.

2. In vehicle brake testing apparatus including a platform movably mounted for reciprocation while supportedly engaging a wheel controlled by the brake under test, the combination of a light weight supporting frame for the platform and a relatively movable mounting between the frame and platform, and mechanism for reciprocating the platform including a fluid pressure cylinder having side and end walls attached to said platform for movement therewith, a relief port in a side wall of the cylinder midway between the end walls, a pair of spaced pistons mounted in stationary transverse relation within said cylinder forming with the walls thereof two variable volume chambers, a pair of gauges each communicably connected with one of said chambers for measuring pressures developed therein, and combination pressure fluid supply and relief conduits including valves communicably connected respectively with each chamber.

3. Apparatus adapted for testing automobile brakes comprising a portable frame adapted to function as a stationary supporting base, a platform movably mounted for reciprocation on said frame and having a pair of raised lateral shoulders and a central flat table between the shoulders adapted to function as a support for the periphery of a wheel controlled by the brake under test, a pair of pressure fluid cylinders each attached to one lateral shoulder of said platform for movement therewith, a relief port in the side wall of each cylinder midway between the end walls, a pair of pistons mounted in stationary spaced relation within each cylinder and forming within the cylinder a constant volume chamber between the pistons and two variable volume chambers lying respectively between each piston and the adjacent cylinder end wall, a gauge communicably connected with one of the variable volume chambers, pressure fluid supply and relief conduits communicably connected with the variable volume chambers, and valve means for controlling the supply and relief of pressure fluid to and from the variable volume chambers.

4. Apparatus for testing vehicle brakes comprising a frame adapted to function as a stationary supporting base, a platform movably mounted for reciprocation on said frame and having a central portion only slightly raised above the frame for supporting a vehicle wheel controlled by the brake under test, a pressure cylinder attached to the platform for movement therewith, piston means mounted in stationary transverse relation within the cylinder and forming with the cylinder walls a variable volume chamber on each side of the piston means, a pair of gauges each communicably connected with one of said chambers for measuring pressures developed therein, and stationary supporting means connected to the piston means and comprising pressure fluid supply and relief conduits communicably connected respectively with each chamber.

5. In a vehicle brake testing apparatus in which a fluid pressure cylinder including a piston is employed to provide power for rotating a vehicle wheel, a two-way valve mechanism for alternately admitting air to and exhausting air from said cylinder comprising a plunger carrying a valve plug, a seat for the plug, means for normally holding the plug away from the seat, a plurality of pressure relief apertures in the plunger adapted to permit the passage of fluid when said plug is unseated, and an unobstructed orifice through said plug and plunger through which fluid may pass in either direction regardless of the position of said plunger or said plug.

6. An apparatus for testing vehicle brakes comprising a frame adapted to function as a stationary supporting base, a platform mounted for movement on said frame and having a relatively flat portion raised above the frame for supporting a vehicle wheel controlled by the brake to be tested, a pressure cylinder attached to said platform for movement therewith, a piston means mounted in said cylinder in a fixed position with respect to said frame and forming with the cylinder walls a variable volume chamber, a pressure gauge communicably connected with said chamber for measuring pressures developed therein, and stationary supporting means connected to the piston means and comprising fluid supply and relief means communicably connected with said chamber.

7. An apparatus for testing vehicle brakes as defined by claim 6 in which said fluid supply and relief means includes an automatically acting two-way valve adapted to supply fluid under pressure at a relatively slow rate to said chamber and to discharge fluid therefrom at a relatively high rate.

8. In an apparatus including a fluid pressure cylinder and a piston therein for supplying power, a two-way valve mechanism for alternately admitting air to and exhausting air from said cylinder comprising a plunger carrying a valve plug, a seat for the plug, means for normally holding the plug away from the seat, a plurality of pressure relief apertures in the plunger adapted to permit the passage of fluid when said plug is unseated, and an unobstructed orifice through said plug and plunger through which fluid may pass in either direction regardless of the position of said plunger or said plug.

9. An apparatus for testing vehicle brakes comprising a frame adapted to function as a stationary supporting base, a platform mounted for movement on said frame and having a relatively flat portion raised above the frame for supporting a vehicle wheel controlled by the brake to be tested, a pressure cylinder attached to said platform for movement therewith, a piston means mounted in said cylinder in a fixed position with respect to said frame and forming with the cylinder walls a variable volume chamber, a pressure gauge communicably connected with said chamber for measuring pressures developed therein, and fluid supply and relief means communicably connected with said chamber and comprising an automatically acting two-way valve adapted to supply fluid under pressure at a relatively slow rate to said chamber and to discharge fluid therefrom at a relatively high rate.

10. Apparatus for treating vehicle brakes comprising a frame adapted to function as a stationary supporting base, a platform movably mounted for reciprocation on said frame and having a central portion only slightly raised above the frame for supporting a vehicle wheel controlled by the brake under test, a pair of pressure cylinders attached to the platform for movement therewith, piston means mounted in stationary transverse relation within each cylinder and forming with the cylinder walls a pair of non-communicating variable volume chambers on opposite sides of the piston means, a pair of conduits each connecting one of the pair of variable volume chambers in one cylinder with the variable volume chamber on the corresponding side of the piston means in the other cylinder, a pair of gauges each communicably connected with a group of said interconnected chambers for measuring pressures developed therein, and stationary supporting means connected to the piston means and comprising pressure fluid supply and relief conduits communicably connected respectively with each chamber.

THOMAS ANDERSON.